G. B. TREW.
PUMP.
APPLICATION FILED AUG. 23, 1920.
1,415,417.
Patented May 9, 1922.
Fig. 1.
Fig. 2.
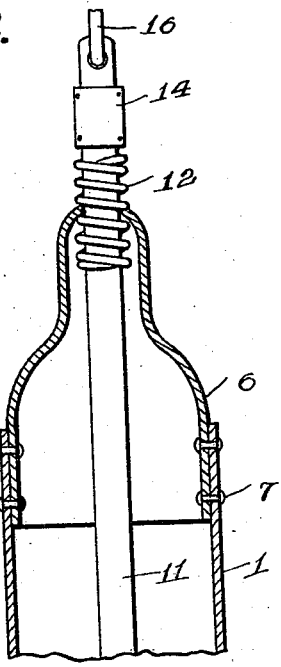
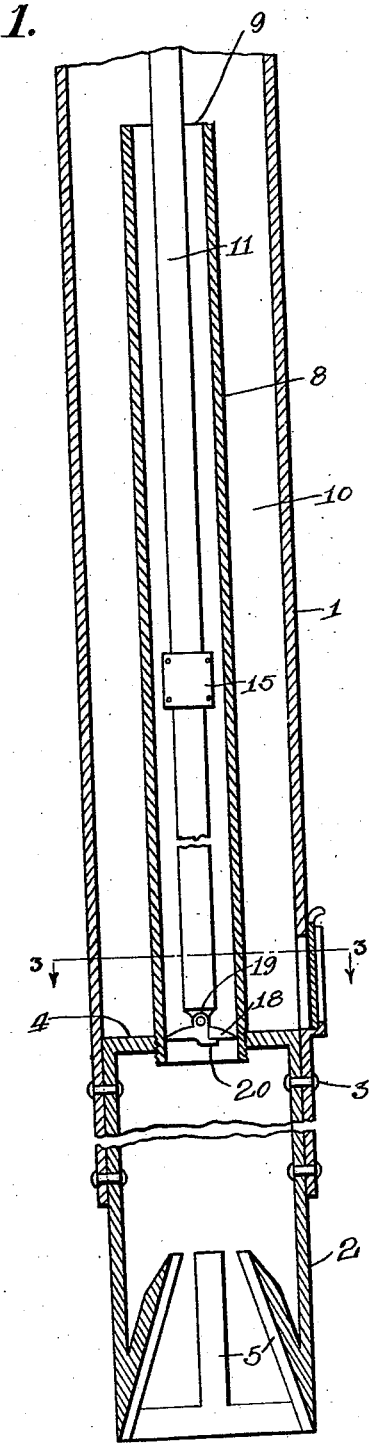
Fig. 3.
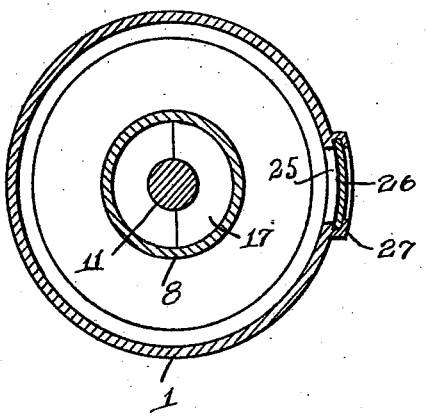
Inventor
G. B. Trew.
By C. A. Snow & Co.
Attorneys

UNITED STATES PATENT OFFICE.

GEORGE BARNETTE TREW, OF SHREVEPORT, LOUISIANA.

PUMP.

1,415,417.  Specification of Letters Patent.  Patented May 9, 1922.

Application filed August 23, 1920. Serial No. 405,285.

*To all whom it may concern:*

Be it known that I, GEORGE B. TREW, a citizen of the United States, residing at Shreveport, in the county of Caddo and State of Louisiana, have invented a new and useful Pump, of which the following is a specification.

It is the object of the present invention to provide a simple but efficient means whereby mud, silt and the like may be pumped out of the bottom of a well, it being possible to accumulate a considerable amount of material before the material is raised out of the well. The invention aims to provide a device of the kind mentioned in which the material may be collected by a series of short strokes, it being unnecessary to lift a long column of mud.

It is within the province of the disclosure to improve generally and to enhance the utility of devices of that type to which the invention appertains.

In the accompanying drawings:—

Figure 1 shows in longitudinal section, the lower portion of a device constructed in accordance with the invention; Figure 2 shows in longitudinal section, the upper portion of a device constructed in accordance with the invention; Figure 3 is a cross section on the line 3—3 of Figure 1.

In carrying out the invention there is provided an outer tubular casing 1. A foot 2 is secured at 3 to the casing 1, the top 4 of the foot 2 forming the bottom of the casing 1, although the bottom of the casing may be fashioned in any desired way. The foot 2 is provided with inwardly extended spurs 5, which serve, at once, to anchor the casing 1 in the mud or silt at the bottom of a well, and serves, also, to break up and distribute the mud or silt when the same is sucked upwardly by the action of the pumping device hereinafter described.

A head 6 is secured at 7 on the upper end of the casing 1. The numeral 8 denotes a cylinder located within the casing 1. The cylinder 8 opens at its lower end through the bottom 4 of the casing 1 and is connected to the bottom. The upper end of the cylinder 8 terminates as shown at 9, at a considerable distance below the upper end of the outer casing 1, the space defined by the casing 1, the cylinder 8 and the bottom 4 constituting a receptacle 10 wherein the mud or silt is received, under conditions to be pointed out hereinafter. The numeral 11 marks a plunger mounted to reciprocate in the head 6, the plunger extending downwardly in the casing 1, into the cylinder 8. A spring 12 is held in the upper end of the head 6. The plunger 11 has an abutment 14 which engages the upper end of the spring 12 on the down stroke, the plunger having an abutment 15 which engages the lower end of the spring on the upstroke.

The plunger 11 may be operated by any suitable means, such as a cable 16, connected to the upper end of the plunger. On the lower end of the plunger 11 there is a piston 17 which may be made in many ways without departing from the spirit of the invention. Preferably, however, the piston 17 consists of a pair of leaves 18, pivoted to each other, and pivoted to the lower end of the plunger 11 as shown at 19, so that the leaves 18 may swing upwardly and downwardly. Each leaf is provided with an extension 20, prolonged beneath the other leaf, so that the leaves cannot fold downwardly beyond the approximately horizontal position shown in Figure 1 of the drawings.

In practical operation, the entire device is lowered into a well, by means of the cable 16. Whilst the device is being lowered, the abutment 15 is in engagement with the lower end of the spring 12, the piston 17 being disposed in the cylinder 8, relatively near to the upper end of the cylinder. Ultimately, the foot 2 encounters the mud or silt in the bottom of the well. Then, the casing 1 is held in the bottom of the well, by the weight of the casing, or by the hold which the spurs 5 may secure in the mud. By means of the cable 16, a reciprocating movement may be imparted to the plunger 11 and to the piston 17. On the downstroke, the leaves 18 fold upwardly, the piston 17 being thrust downwardly into the column of mud in the cylinder 8. On the upstroke, the piston 17 raises so much of the mud as may be in the cylinder 8 above the piston, more mud being sucked into the lower end of the cylinder, below the piston, the spurs 5 serving to break up and separate the mud as the mud moves upwardly. On the upstroke, the mud is delivered over the upper end 9 of the cylinder 8 and moves downwardly into the receptacle 10. When a sufficient quantity of mud has accumulated in the receptacle 10, the entire device may be hoisted out of the well by means of the cable 16. One of the many advantages of the device is that it is unnecessary to lift, at each stroke, a long column of mud equal in height to the distance from the bottom of the well to the top thereof. Any suitable means may be provided for letting the mud out of the receptacle 10. If desired, a hole 25 may be formed in the casing 1 close to the bottom 4 of the casing, the hole being closed by a trap door 26, slidable in guides 27 on the casing.

Having thus described the invention, what is claimed is:—

In a device of the class described, an outer casing having a bottom; a cylinder carried by the bottom and opening through the bottom; a plunger mounted to reciprocate in the cylinder; a piston carried by the plunger and embodying pivotally mounted upwardly-foldable leaves provided with cooperating means for limiting the downward folding movement of the leaves, the piston and the plunger constituting means for delivering material from within the cylinder into the space between the cylinder and the casing; and interengaging elements on the plunger and on the casing, cooperating to limit relative movement between the casing and the plunger, when the plunger moves upwardly and when the plunger moves downwardly, one of said elements being resilient, to serve as a cushion.

In testimony that I claim the foregoing as my own, I have hereto affixed my signature in the presence of two witnesses.

GEORGE BARNETTE TREW.

Witnesses:
B. B. CURTIS,
FRANK J. LOUNEY.